INVENTORS
DAVID R. MITCHELL
HAROLD L. LOVELL
SHIOU-CHUAN SUN

ATTORNEY

INVENTORS
DAVID R. MITCHELL
HAROLD L. LOVELL
SHIOU-CHUAN SUN

ATTORNEY

United States Patent Office 3,393,975
Patented July 23, 1968

3,393,975
TREATMENT OF ALUMINA-CONTAINING MATERIAL FOR THE MANUFACTURE OF ALUMINUM SULFATE
David R. Mitchell, Harold L. Lovell, and Shiou-Chuan Sun, State College, Pa., assignors to Pennsylvania Electric Company, Johnstown, Pa., a corporation of Pennsylvania
Filed May 20, 1966, Ser. No. 551,791
6 Claims. (Cl. 23—123)

ABSTRACT OF THE DISCLOSURE

A process for the production and recovery of aluminum sulfate from alumina-containing materials, wherein the alumina-containing materials are subjected to calcining, preferably under reducing conditions, and then to a magnetic separation operation to separate magnetic materials therefrom. The remaining calcined, non-magnetic fraction is then subjected to a multi-stage, continuous, countercurrent extraction operation with sulfuric acid to produce a liquid effluent containing aluminum sulfate dissolved therein. Desirably, any iron dissolved in the liquid effluent is removed therefrom prior to crystallization of the aluminum sulfate, the crystallization operation being carried out in the presence of added sulfuric acid.

---

Figure 1:
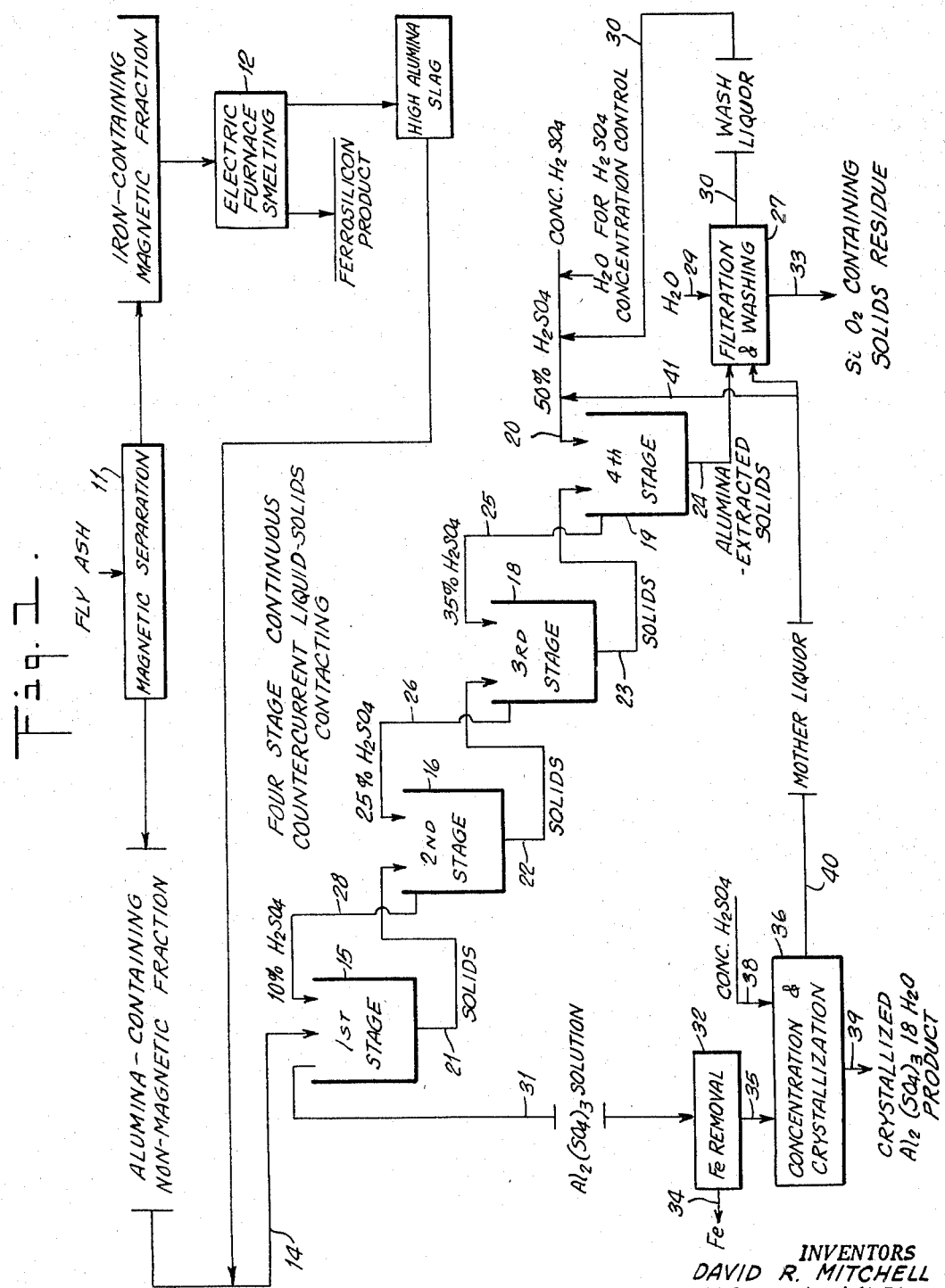

This invention relates to the treatment of alumina-containing materials. More particularly, this invention relates to the treatment of alumina-containing materials with sulfuric acid for the production of aluminum sulfate. Still more particularly, this invention relates to the continuous countercurrent treatment of alumina-containing materials with sulfuric acid for the production and recovery of aluminum sulfate.

In accordance with one embodiment, this invention is directed to the treatment of alumina-containing fly ash, such as fly ash recovered as a combustion product from an ash-forming fuel, e.g. an ash-forming soft coal. In accordance with yet another embodiment this invention is directed to the treatment of alumina-containing clays, such as flint clays, diaspore and the like, particularly clays containing a substantial amount, such as at least about 40% by weight, alumina. A flint clay, for example, flint clay as found in Pennsylvania, is a sedimentary mixture of clay minerals in kaolinite. Such clays are changed by geological conditions to a hard, flint-like rock, being brittle and exhibiting a conchoidal fracture. An analysis of a typical Pennsylvania flint clay indicates it contains about 41% by weight $SiO_2$, 49% by weight $Al_2O_3$, 3% by weight $Fe_2O_3$ and exhibits a loss on ignition (LOI) at 750° C. for 30 minutes of about 14% by weight.

Attempts have been made in the past to upgrade and/or recover values from clays. Such attempts, however, when directed to the production of aluminum sulfate from alumina-containing clays for the most part have not been commercially successful. Also, attempts have been made to recover values from fly ash. For the most part, attempts to upgrade fly ash or to recover values therefrom have not included a chemical alteration or the extraction of valuable chemicals from the fly ash. However, those attempts which have involved chemical treatment or the recovery of chemical values from fly ash do not appear to have been commercially successful.

Clays, particularly alumina-containing clays wherein the alumina content is upwards of 40% by weight, make up a vast, potentially commercially valuable source of alumina and a potentially commercially valuable raw material for the manufacture of aluminum sulfate. In the chemical treatment of such clays for the manufacture and recovery of aluminum sulfate therefrom a large, inexpensive source of sulfuric acid would be desirable. At present it appears that such a source of sulfuric acid at a suitable concentration will become available. A process has been proposed for the recovery of sulfur oxides from flue gases in the form of sulfuric acid. Enormous quantities of sulfur oxide gases, $SO_2$ and $SO_3$, are being discharged into the atmosphere at large central power stations by the combustion of a sulfur-containing, ash-forming coal. The discharge of sulfur oxide gases into the atmosphere has given rise to atmospheric pollution problems. To avoid these atmospheric pollution problems and to recover the potentially valuable sulfur oxide gases from the combustion flue gases a process involving the catalytic conversion of sulfur dioxide in these gases to sulfur trioxide, followed by the conversion of the sulfur trioxide to sulfuric acid, with recovery of the resulting produced sulfuric acid, such as sulfuric acid having a concentration in the range 50–95% by weight $H_2SO_4$, has been developed. This sulfuric acid would appear to be inexpensive, useful and satisfactory in the treatment of alumina-containing materials in accordance with this invention for the production and recovery of aluminum sulfate.

Accordingly, it is in object of this invention to provide an improved process for the production and recovery of aluminum sulfate from alumina-containing materials, such as alumina-containing fly ash, alumina-containing clays, e.g. flint clays, and the like and mixtures thereof.

Another object of this invention is to provide an improved process involving continuous countercurrent extraction with a sulfuric acid for the recovery and production of aluminum sulfate from alumina-containing materials.

Yet another object of this invention is to provide an improved process for the recovery of values from alumina-containing, iron-containing fly ash.

Figure 2:
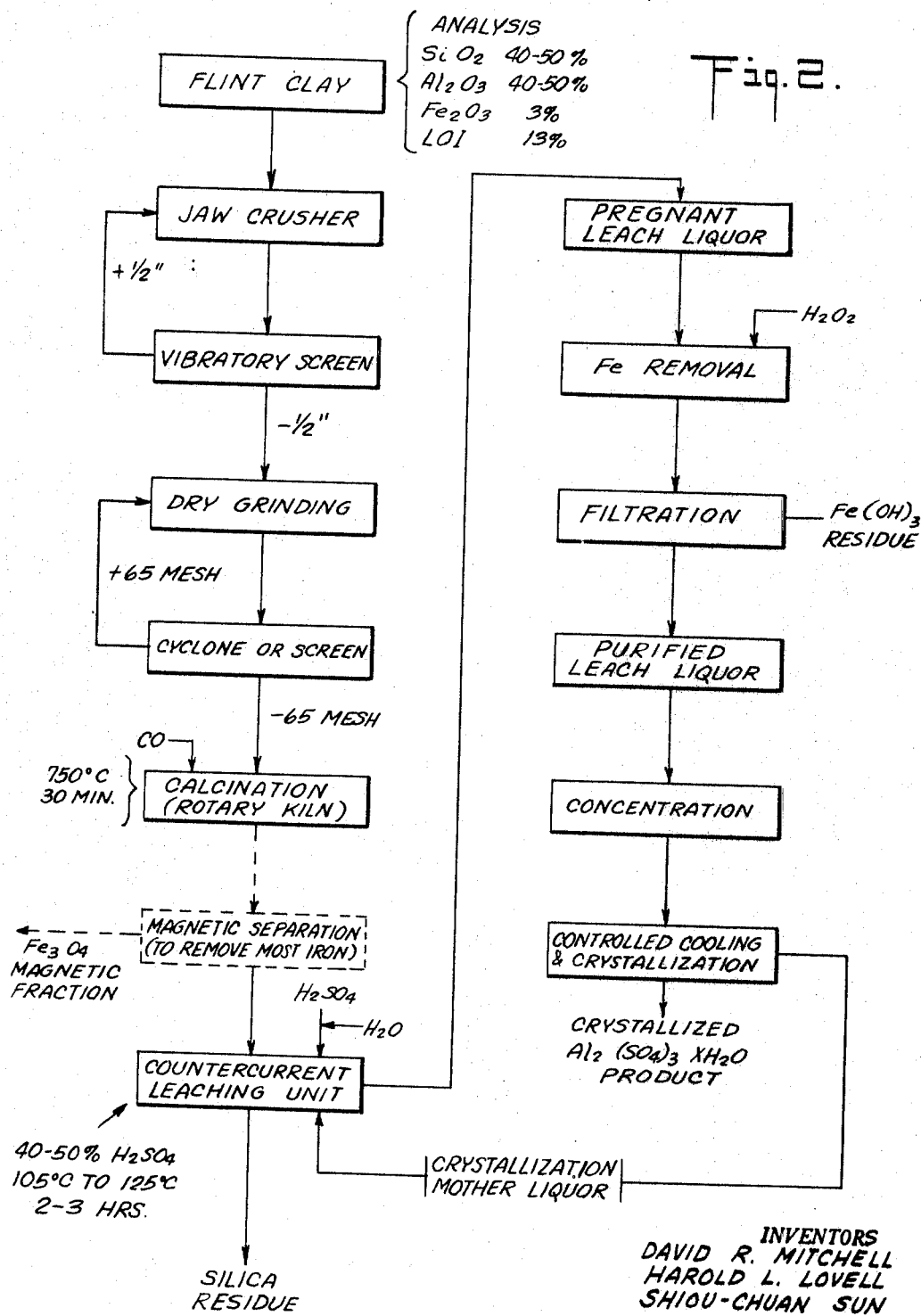

How these and other objects of this invention are achieved will become apparent in view of the accompanying disclosure made with reference to the accompanying drawings wherein:

FIG. 1 is a flow diagram illustrating the application of the practice of this invention to the chemical treatment of alumina-containing fly ash for the production and recovery of aluminum sulfate therefrom; and wherein FIG. 2 is a flow chart illustrating the practice of this invention with respect to the chemical treatment of a flint clay for the production and recovery of aluminum sulfate therefrom.

In at least one embodiment of the practice of this invention at least one of the foregoing objects will be achieved.

In accordance with this invention there is provided a process for the chemical treatment of alumina-containing materials for the production and recovery of aluminum sulfate. More particularly, in accordance with this invention there is provided a process involving the chemical treatment of alumina-containing materials, such as flint clays and fly ash, for the production and recovery of aluminum sulfate. The chemical treatment includes a multi-stage, continuous countercurrent contacting operation wherein the alumina-containing materials undergoing treatment are brought into contact with sulfuric acid for the production of aluminum sulfate.

The multi-stage, continuous countercurrent contacting operation in accordance with this invention involving suitable means and techniques for effecting liquid-solids contacting, includes a primary or first stage liquid-solids contacting operation, at terminal stage, also involving liquid-solids contacting and at least one intermediate stage, also involving liquid-solids contacting. In accordance with this invention the alumina-containing material undergoing treatment is supplied to the first stage contacting operation for contact with relatively dilute, e.g. about 10% by weight, sulfuric acid.

The liquid derived from the first stage contacting operation is recovered therefrom substantially free of sulfuric acid and containing a substantial amount of aluminum sulfate dissolved therein. The undissolved residual solids from the first stage contacting operation are supplied to the succeeding intermediate stage for contact with sulfuric acid of greater concentration, e.g. about 25%.

The liquid effluent from this intermediate stage contacting operation comprising about 10% by weight sulfuric acid, makes up the relatively dilute sulfuric acid employed in the first stage contacting operation. The undissolved residual solids from the aforesaid intermediate stage contacting operation then pass through one or more succeeding contacting operations for contact with sulfuric acid of increasing concentration until supplied to the terminal contacting operation wherein the undissolved residual solids are brought into contact with relatively concentrated sulfuric acid, e.g. about 50–90% by weight $H_2SO_4$.

As indicated, the liquid effluent comprising sulfuric acid flows from the terminal stage contacting operation toward and through the intermediate stages and to the first stage contacting operation serving to supply the sulfuric acid thereto. Also, as indicated, the alumina-contaning material initially supplied to the first stage, moves from the first stage contacting operation in sequence through the intermediate stages to the terminal stage contacting operation. In this above-described sequence of operations the alumina-containing material supplied to the first stage contacting operation and the concentrated sulfuric acid supplied to the terminal stage contacting operation move in continuous, countercurrent contact. Desirably, in the continuous, countercurrent contacting operation in accordance with this invention the terminal stage is operated at a higher temperature, e.g. about 120–125° C., than the first stage contacting operation, e.g. at a temperature in the range 95–105° C. The intermediate stages of the contacting operation are operated at temperatures intermediate the operating temperatures of the terminal stage and the first stage in descending order of temperature in the direction from the terminal stage to the first stage, i.e. the intermediate stage immediately next to the terminal stage downstream in the direction of the flow of sulfuric acid during the countercurrent contacting operation is at a temperature lower than the temperature of the terminal stage, e.g. a temperature of about 115° C. If desired, however, the continuous, countercurrent extraction operation in accordance with this invention may be carried out isothermally, i.e. each of the contacting stages being operated at substantially the same temperature, a temperature in the range 90–125° C., more or less.

In the continuous countercurrent contacting operation the amount of sulfuric acid employed, i.e. the amount of sulfuric acid supplied to the terminal stage for the reaction with the alumina-containing material supplied to the first stage, is at least stoichiometric with respect to the alumina content of the alumina-containing material for reaction therewith to yield aluminum sulfate. Desirably, an exess of sulfuric acid is employed since the alumina-containing material usually contains other materials, such as iron-containing compounds, e.g. iron oxide, which also tend to react with the sulfuric acid. When at least a stoichiometric amount of sulfuric acid is employed substantially all of the alumina present in the alumina-containing material, such as at least about 80% by weight, reacts with the sulfuric acid and is ultimately recoverable as aluminum sulfate product. Further, if desired, by controlling the weight ratios of the solids undergoing contact with respect to the sulfuric acid in each of the contacting stages in the continuous, countercurrent contacting operation in accordance with this invention, substantially complete consumption of the sulfuric acid is possible such that the liquid effluent withdrawn from the first contacting stage is substantialaly acid free and such that the undissolved residual solids withdrawn from the terminal contacting stage is substantially alumina free.

Variation in the weight ratio of the solids to acid content in each of the contacting stages can be achieved by individual control of the amount of sulfuric acid supplied to the contacting stages. It is usually preferred to operate the first stage contacting operation at a higher solids to liquid weight ratio than the other contacting operations. Fresh concentrated or dilute sulfuric acid can be supplied separately to the terminal stage or to one or all of the intermediate stages and/or to the first stage. Desirably, also, the concentration of the aluminum sulfate dissolved in the liquid effluent removed from the first stage is maintained at a level substantially below that at which crystallization of aluminum sulfate might sponteneosuly occur. Accordingly, the concentration of the dissolved aluminum sulfate of the liquid effluent removed from the first stage is maintained below that concentration at which the liquid effluent is saturated with respect to aluminum sulfate at the temperature at which it is withdrawn from the first stage.

Referring now to FIG. 1 of this invention which schematically illustrates the application of the practice of this invention to the treatment of alumina-containing fly ash for the production and recovery of aluminum sulfate, fly ash from a suitable source is supplied to a magnetic separation unit 11 wherein the fly ash is subjected to a magnetic field for the separation by magnetic attraction of the magnetic components or fraction of the fly ash from the non-magnetic components or fraction. The magnetic components or fraction of the fly ash comprises a substantial amount, if not substantially all, of the iron-containing components of the fly ash with the result that the magnetic separation serves to separate the fly ash into a magnetic iron-containing fraction and an alumina-contaning non-magnetic fraction.

The iron-containing magnetic fraction is supplied, in accordance with one embodiment of the practice of this invention, to an electric smelting unit 12 for the production of a ferrosilicon product and a relatively high alumina content slag.

The alumina-containing, non-magnetic fraction together with, if desired, the high alumina content slag produced and recovered from the electric furnace smelting operation are admixed and supplied via line 14 to the first stage 15 of the illustrated four-stage continuous countercurrent liquid-solids contacting operation which also comprises a second stage liquid-solids contactor 16, a third stage liquid-solids contactor 18 and a fourth or terminal stage liquid-solids contactor 19.

Concentrated sulfuric acid, such as sulfuric acid having a concentration of at least about 50% by weight $H_2SO_4$, is supplied to the fourth stage contactor 19 via line 20.

As indicated, the undissolved solids residue from first stage contactor 15 passes via line 21 to second stage contactor 16 and the undissolved solids residue from second stage contactor 16 passes via line 22 to third stage contactor 18 and the undissolved solids residue from third stage contactor 18 passes via line 23 to fourth stage contactor 19. Also, liquid effluent, now having a reduced $H_2SO_4$ content, about 35% by weight $H_2SO_4$, is supplied from fourth stage contactor 19 via line 25 to third stage contactor 18. In turn, liquid effluent comprising a lower $H_2SO_4$ content, about 25% by weight $H_2SO_4$, is supplied from third stage contactor 18 via line 26 to second stage contactor 16. Further, liquid effluent from second stage contactor 16, now having an even lower $H_2SO_4$ content, about 10% by weight $H_2SO_4$, is supplied from second stage contactor 16 via line 28 to first stage contactor 15.

The remaining undissolved residual solids, originally derived from the fly ash material supplied via line 14 to first stage contactor 15, are removed from the bottom of fourth stage contactor 19 via line 24. These solids removed via line 25 are substantially depleted of alumina content, i.e. are substantially alumina free. These solids, usually in slurry form with relatively concentrated sulfuric acid, are supplied to filtration and washing unit 27 for the separation of the solids therefrom which are recovered, after filtration and washing, via line 33. These solids, comprising substantially only $SiO_2$, are then disposed of by any suitable means.

Water supplied via line 29 to filtration and washing unit 27 as wash water is ultimately recovered as wash liquor via line 30 and supplied for admixture with the concentrated sulfuric acid supplied to fourth stage contactor 19 via line 20.

The liquid effluent from first stage contactor 15 containing aluminum sulfate dissolved therein, the aluminum sulfate representing substantially all of and being derived from the alumina present in the fly ash material supplied via line 14 to first stage contactor 15, is supplied via line 31 to an iron removal operation or unit 32 by any suitable technique for the removal of iron contamination. Iron-containing material is recovered from iron removal unit 32 via line 34 for disposal by any suitable means.

The remaining aluminum sulfate-containing solution from iron removal unit 32, now substantially free of iron contamination, is supplied via line 35 to aluminum sulfate concentration and crystallization unit 36 wherein under controlled conditions of temperature and concentration and desirably in the presence of sulfuric acid supplied via line 38, aluminum sulfate usually in the form of crystalline aluminum sulfate $Al_2(SO_4)_3 \cdot 18H_2O$ is recovered via line 39 as product. The mother liquor remaining from the crystallization of the aluminum sulfate is supplied from concentration and crystallization unit 36 via line 40 to filtration and washing unit 27 as wash liquid and/or via line 41 to line 20 for commingling with the concentrated sulfuric acid supplied to fourth stage contactor 19. The removal of the iron in the liquid effluent removed via line 31 from first stage contactor 15 is especially desirable if the aluminum sulfate recovered as product is to be used in certain special areas, such as in the manufacture of paper. Usually, the amount of iron present in the liquid effluent recovered from first stage contactor 15 is about 1 part by weight iron to about 70–80 parts by weight aluminum sulfate as $Al_2(SO_4)_3$.

Iron removal may be effected by any suitable technique. Such techniques include controlled oxidation precipitation wherein hydrogen peroxide or other suitable oxidant is added to the iron-contaminated aluminum sulfate solution to precipitate the iron as ferric hydroxide which is recoverable by filtration. Another technique is the controlled caustic precipitation wherein lime or caustic soda is added to the iron-contaminated aluminum sulfate solution to precipitate the iron as iron hydroxide. Other techniques for iron removal involve permanganic acid treatment, electrolysis, ion exchange, solvent extraction and precipitation of the iron content, such as in the form of ferric thiocyanide, see U.S. 2,359,340. If desired, also, instead of carrying out the concentration and crystallization of the aluminum sulfate the aluminum sulfate containing liquid effluent recovered from first stage contactor 15 may be sold directly as product, as is or after removal of the iron contamination therefrom.

FIG. 2 of the drawings is a flow chart indicating the applicability of the process of this invention to the treatment of alumina-containing clay, such as flint clay, for the production of aluminum sulfate. Lump flint clay having the approximate analysis 40–50% by weight $SiO_2$, 40–50% by weight $Al_2O_3$, 3% by weight $Fe_2O_3$ and 13% by weight LOI is supplied to a suitable size reduction unit, such as a jaw crusher. The resulting crushed flint clay is then passed to a suitable size separating unit, such as a vibratory screen, sized to pass crushed flint clay having a particle size smaller than ½". Larger size crushed flint clay is returned to the jaw crusher.

The crushed, sized flint clay having a particle size less than ½" is then subjected to dry grinding, followed by screening to yield a finely divided flint clay having a particle size smaller than 65 mesh. Larger particle size clay material, i.e. having a particle size greater than 65 mesh, is returned to the dry grinding operation for further size reduction.

The ground flint clay is then calcined at a temperature in the range from about 700° C. to about 750° C. for about 30 minutes, preferably in the presence of a reducing gas, such as carbon monoxide. Calcining appears to be advantageous in that it tends to break up or destroy the original clay structure of the flint clay by the removal of water. This results in a more porous reactive flint clay. Advantageously, also, when calcining is carried out in a reducing atmosphere, the iron oxide $Fe_2O_3$ component of the flint clay is reduced to magnetic iron oxide $Fe_3O_4$.

Following calcining under a reducing atmosphere, the resulting calcined flint clay is passed to a magnetic separation unit wherein the magnetic iron oxide $Fe_3O_4$ is removed. The resulting calcined flint clay, now having a substantially lower iron oxide content and made up of substantially only non-magnetic components, such as alumina and silica, is supplied to a four stage continuous countercurrent leaching unit wherein it is contacted in a multistage operation, as described in connection with FIG. 1, with 40–50% or higher by weight $H_2SO_4$ at a temperature in the range 105–125° C. for about 2–3 hours under ambient atmospheric conditions.

Following the leaching operation there is recovered a substantially alumina free silica residue which can be disposed of by any suitable means. There is also recovered an aluminum sulfate leach liquor containing aluminum sulfate dissolved therein. The aluminum sulfate dissolved in the leach liquor represents substantially all of the sulfuric acid and substantially all of the alumina content of the flint clay supplied as feed materials to the continuous countercurrent leaching unit.

For the removal of any iron contamination, the aluminum sulfate containing leach liquor, which is usually recovered from the leaching unit at a pH in the range 2–3, is treated by the addition of hydrogen peroxide or other suitable oxidant. Upon the addition of a suitable amount of hydrogen peroxide the iron dissolved in the leach liquor is precipitated as ferric hydroxide $Fe(OH)_3$ which is then separated by filtration.

The resulting purified, substantially iron-free leach liquor is then concentrated and cooled under controlled conditions to effect crystallization and precipitation of aluminum sulfate $Al_2(SO_4)_3 \cdot 18H_2O$ which is then recovered, such as by filtration, as product. The remaining mother liquor is then advantageously recycled to the leaching unit together with water, as may be required, and additional fresh sulfuric acid to carry out the leaching operation.

In the practice of this invention a four-stage continuous countercurrent leaching operation, as illustrated in FIG. 2, presents significant advantages. In a four-stage continuous countercurrent contacting operation substantially all of the alumina present in the alumina-containing material, such as flint clay, undergoing treatment is recoverable as aluminum sulfate. Additional stages, such as a five-stage continuous countercurrent contacting operation, appears to present no additional advantages.

Other techniques useful for the recovery of substantially iron-free aluminum sulfate by the precipitation or removal of the iron contaminants include the addition of lime or caustic soda to precipitate the iron as iron hydroxide. Another technique is the addition of an alcohol to the leach liquor. The addition of an alcohol tends to selectively decrease the solubility of the aluminum sulfate and to precipitate the same as a substantially iron-free aluminum sulfate product. Still another technique useful for the production of a substantially iron-free aluminum sulfate involves the addition of calcium chloride to the leach liquor to produce a saturated solution containing chloride ions. The resulting solution is then admixed with methyl isobutyl ketone to bring about the precipitation of an iron-chloride-ketone complex. The aluminum sulfate remains in solution and, after removal of the precipitated complex, is recoverable by crystallization. Desirably, the iron removal operation is carried out to yield an aluminum sulfaate product having a concentration not greater than about 0.5% by weight, such as in the range 0.1–0.5% by weight, iron. If, however, the aluminum sulfate product is to be used in a water purification operation, the amount of iron present may be greater than 0.5% by weight iron. If it is desired to produce substantially pure alumina from aluminum sulfate, such as by thermally decomposing the aluminum sulfate, it is desirable that the iron content of the aluminum sulfate be reduced to below about 0.02% by weight iron.

The following examples are illustrative of the practices of this invention.

Example No. 1

High alumina content clay analyzing about 40% by weight $Al_2O_3$, 8% by weight $Fe_2O_3$, 35% by weight $SiO_2$, 2% by weight miscallaneous and 15% by weight LOI is crushed to less than $\frac{1}{4}''$ particle size. The resulting crushed clay is then calcined at 700° C. with a weight recovery of about 85%. The calcined, crushed clay is then ground to less than 65 mesh and contacted with 70% by weight $H_2SO_4$. There is produced a liquid effluent containing dissolved aluminum sulfate and dissolved iron sulfate. The amount of aluminum sulfate thus produced corresponds to at least about 85% by weight of the alumina present in the clay and the dissolved iron sulfate corresponds to substantially all of the iron oxide present in the clay.

The liquid effluent comprising aluminum sulfate and iron sulfate dissolved therein is then subjected to electrolysis for removal of iron in the form of electrolytic iron which is separately recovered as product. The remaining liquid effluent containing aluminum sulfate dissolved therein is then concentrated and cooled to precipitate the aluminum sulfate as $Al_2(SO_4)_3.18H_2O$. If desired, the aluminum sulfate can be heated to a temperature in the range 200–500° C. to yield an anhydrous aluminum sulfate as product.

Example No. 2

Alumina-containing slag, comparable to slag resulting from the electric furnace smelting of fly ash, analyzing 44% by weight $Al_2O_3$, 33.7% by weight $SiO_2$, 2.7% by weight FeO, 0.9% by weight $TiO_2$, 0.2% by weight phosphorus and 18.5% by weight CaO+MgO, after grinding to smaller than 65 mesh, is subjected to contact with 70% by weight sulfuric acid. In the contacting operation at least about 85% by weight of the alumina in the slag is converted to aluminum sulfate and 100% of the FeO and 100% of the CaO+MgO are converted to the corresponding sulfates. The leach liquor recovered from the contacting operation containing the aluminum sulfate and iron sulfate dissolved therein is then subjected to oxidation to oxidize the ferrous sulfate to ferric sulfate. The ferric sulfate is then recovered by crystallization and filtration. The aluminum sulfate remaining dissolved in the mother liquor is then recovered by concentration and crystallization as hydrated aluminum sulfate product $$Al_2(SO_4)_3.18H_2O$$

Example No. 3

Fly ash, such as is recoverable in the operation of a large central power station burning an ash-forming soft coal, is subjected to magnetic separation to yield a non-magnetic, alumina-containing fraction and a magnetic iron-containing fraction. The recovered non-magetic aluminum-containing fraction analyzed about 30% by weight $Al_2O_3$, 43.5% by weight $SiO_2$, 10.5% by weight $Fe_2O_3$, 1.0% by weight CaO+MgO, 0.5% by weight combined sodium and potassium oxides and 14.5% by weight combustible matter.

The non-magnetic alumina-containing fly ash fraction is then subjected to continuous countercurrent leaching in accordance with this invention by contact with 70% by weight sulfuric acid. There is recovered from the leaching operation a liquid effluent containing aluminum sulfate and iron sulfate dissolved therein and an undissolved solids fraction comprising substantially only $SiO_2$.

The liquid effluent is then subjected to electrolysis for the removal of the dissolved iron content to yield substantially pure electrolytic iron. Following the electrolysis operation there is recovered a solution containing aluminum sulfate dissolved therein. The aluminum sulfate is recovered from this solution by concentration, cooling and crystallization under controlled temperature conditions to yield a crystalline aluminum sulfate product substantially free of iron.

Example No. 4

In a laboratory scale apparatus involving the four-stage continuous countercurrent contacting operation in accordance with this invention wherein each stage comprises a contactor and a settler, −65 mesh calcined flint clay was fed continuously by means of a small screw feeder into the first stage contactor. A 500 ml. modified round bottom Pyrex flask made up the first stage contactor and was maintained at a predetermined temperature level. The first stage contactor was also continuously supplied with supernatant liquor from the second stage settler, a specially modified 600 ml. Pyrex beaker, associated with the second stage contactor, also a modified 500 ml. round bottom Pyrex flask, by means of amulti-channel laboratory pump. Solids from the first stage settler were supplied to the second stage contactor. The treated solids flowed periodically by gravity from the contactor to the settler and then to the next stage contactor and settler combination in the form of a slurry. The aforesaid operations were carried out throughout the entire set-up involving continuous countercurrent liquid-solids flow in the sequence first stage, second stage, third stage and fourth stage contactors with associated first stage, second stage, third stage and fourth stage settlers.

Fifty percent by weight $H_2SO_4$ was flowed continuously by gravity into the fourth stage contactor and the fourth stage solids residue was taken from the settler of the fourth stage at the end of the run. Also liquid effluent containing dissolved aluminum sulfate was recovered as the supernatant liquid from the first stage settler. The results of these tests are set forth in the accompanying table.

FOUR STAGE CONTINUOUS COUNTER CURRENT SULFURIC ACID LEACHING OF CALCINED FLINT CLAYS, CALCINED AT 750° C. FOR 30 MINUTES

| | Feed | | | | Pregnant leach liquor* (product) | | | | | | Final Residue | |
|---|---|---|---|---|---|---|---|---|---|---|---|---|
| | $Al_2O_3$, percent | $Fe_2O_3$, percent | LOI, percent | Feed rate (gm./hr.) | 50% $H_2SO_4$ | | $Al_2(SO_4)_3$ | | Fe concn. (gm./l.) | $Al_2O_3$ recovery percent by wt. | Flow (gm./hr.) | $Al_2O_3$ content, percent by wt. |
| | | | | | Feed rate (ml./hr.) | Flow rate (ml./hr.) | Concn. (gm./l.) | Flow rate (gm./hr.) | | | | |
| Flint Clay No. 1 | 49.05 | 3.01 | 13.8 | 50 | 150 | 503 | 162 | 81.5 | 1.9 | 86.0 | 19.0 | 4.2 |
| Flint Clay No. 2 | 38.8 | 2.96 | 12.7 | 25 | 75 | 260 | 136.7 | 35.6 | 2.11 | 95.4 | 13.0 | 1.84 |

*Water was added to the settler of the first stage contactor in order to prevent aluminum sulfate crystallization.

| Contactor: | Temperature (° C.) |
|---|---|
| 1st stage | 104 |
| 2d stage | 110 |
| 3d stage | 115 |
| 4th stage | 120 |

As will be apparent to those skilled in the art in the light of the foregoing disclosures, many modifications, alterations and substitutions are possible in the practice of this invention without departing from the spirit or scope thereof.

We claim:

1. The treatment of particle-form alumina-containing clay for the production of aluminum sulfate which comprises subjecting said alumina-containing clay to calcining under reducing conditions, subjecting the resulting calcined, particle-form alumina-containing clay to a multi-stage continuous countercurrent extraction operation by contact with sulfuric acid to produce a liquid effluent containing aluminum sulfate dissolved therein and a solids residue comprising essentially siliceous material, precipitating aluminum sulfate by crystallization from said liquid effluent in a crystallization zone, recovering the crystallized aluminum sulfate as product and recovering said solids residue.

2. The treatment in accordance with claim 1 wherein said calcining operation is carried out at a temperature in the range 650–900° C. for a period of time in the range 5 minutes–1.5 hours.

3. The treatment in accordance with claim 1 wherein the resulting calcined particle-form alumina-containing clay is subjected to magnetic separation to separate magnetic material therefrom before the remaining calcined alumina-containing clay is subjected to said multi-stage continuous countercurrent extraction operation.

4. The treatment in accordance with claim 1 wherein said alumina-containing clay is a Pennsylvania flint clay analyzing at least about 40% by weight alumina.

5. The treatment in accordance with claim 1 wherein said multi-stage continuous countercurrent extraction operation is carried out at a temperature in the range 75–125° C. and for a period of time in the range 0.5–6.0 hours.

6. The treatment in accordance with claim 1 wherein the liquid effluent substantially free of sulfuric acid and containing aluminum sulfate dissolved therein is subjected to treatment for the removal of iron contamination prior to precipitation of the aluminum sulfate therefrom by crystallization in said crystallization zone.

References Cited

UNITED STATES PATENTS

| 1,529,035 | 3/1925 | Ralston et al. | 23—123 |
| 1,815,888 | 7/1931 | Bailey | 75—24 |
| 1,873,642 | 8/1932 | Guertler | 23—123 |
| 1,945,172 | 1/1934 | Wilson | 23—123 |
| 1,964,382 | 6/1934 | Fleischer | 23—123 |
| 2,743,999 | 5/1956 | Binswanger | 23—38 |
| 3,143,392 | 8/1964 | Saeman | 23—123 |

OSCAR R. VERTIZ, *Primary Examiner.*

G. PETERS, *Assistant Examiner.*